Aug. 13, 1935.　　　G. SWAHNBERG　　　2,011,488
MECHANICAL MOVEMENT FOR TURRET AND LIKE DEVICES
Filed March 14, 1935　　　4 Sheets-Sheet 2
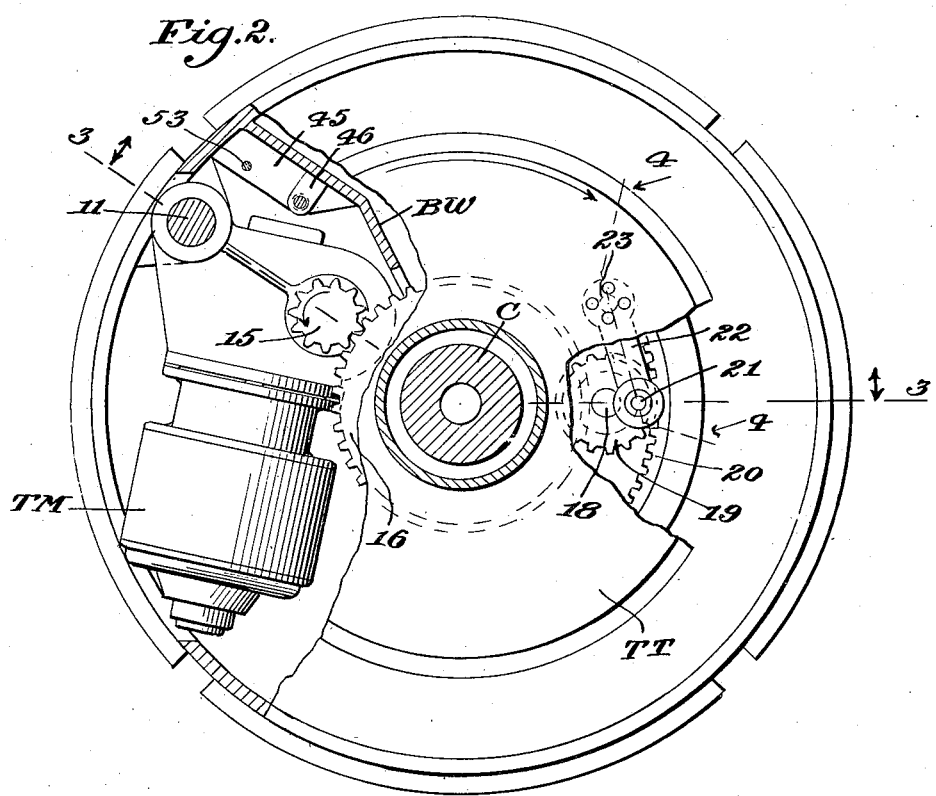
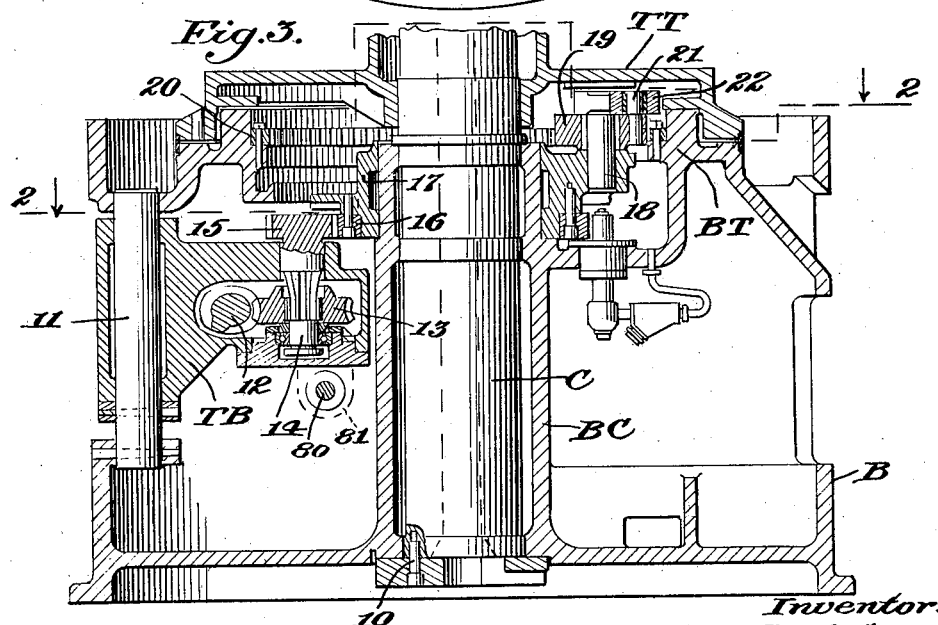
Inventor:
Gunnar Swahnberg,
by
Att'ys.

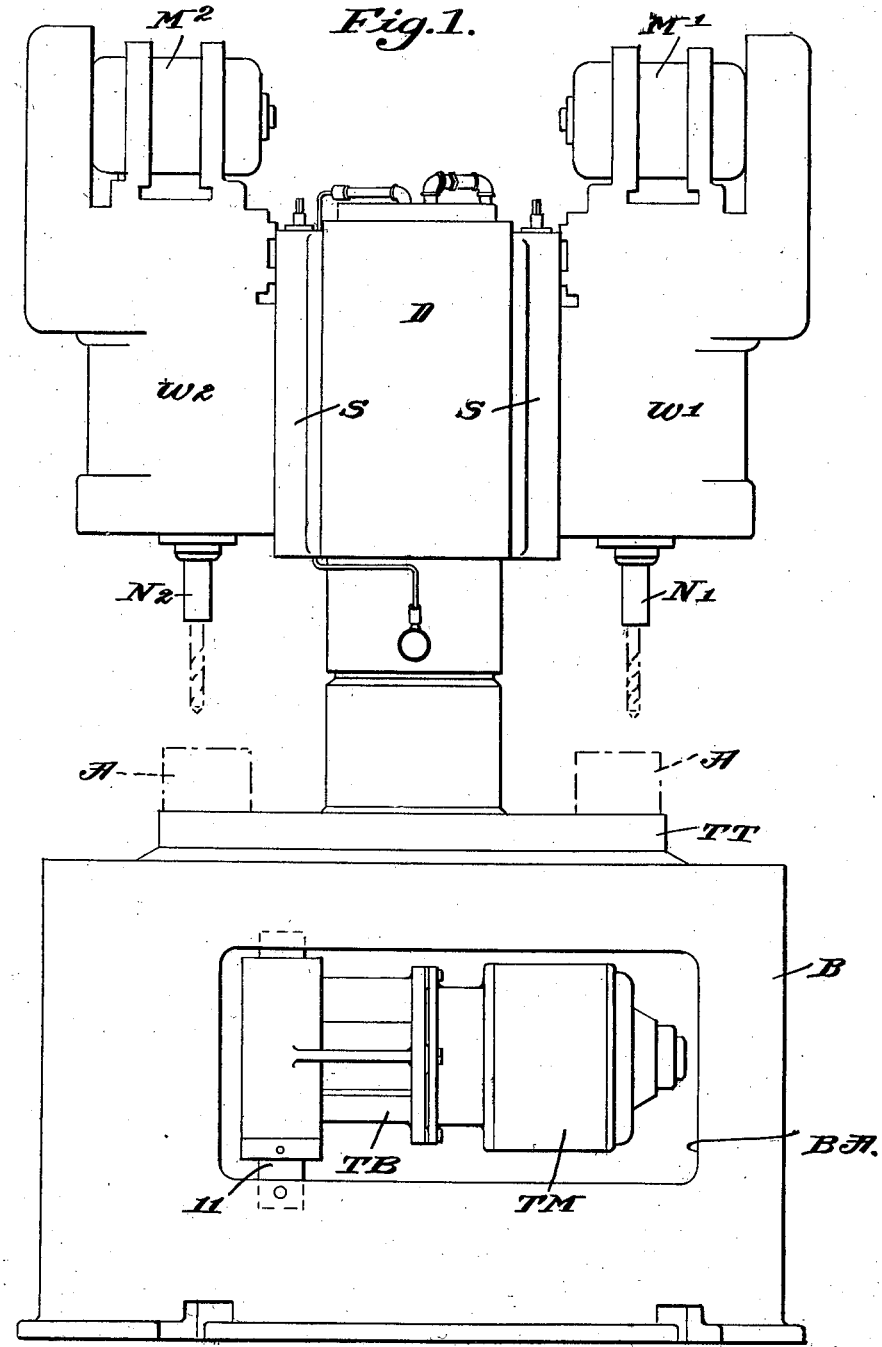

Aug. 13, 1935.   G. SWAHNBERG   2,011,488
MECHANICAL MOVEMENT FOR TURRET AND LIKE DEVICES
Filed March 14, 1935   4 Sheets-Sheet 3
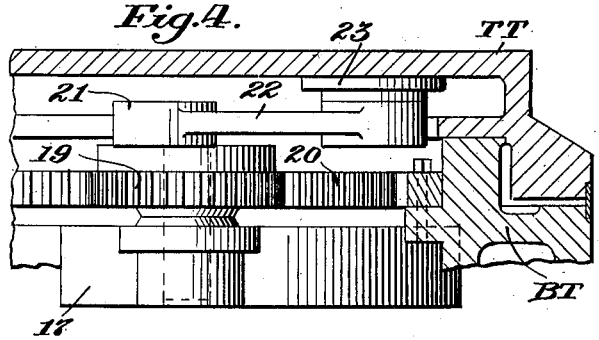
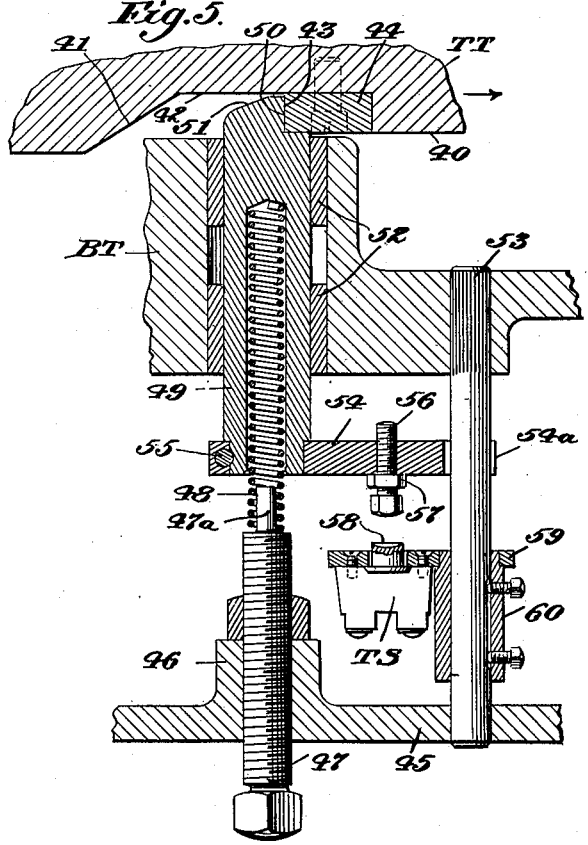
Inventor:
Gunnar Swahnberg,
by
Att'y.

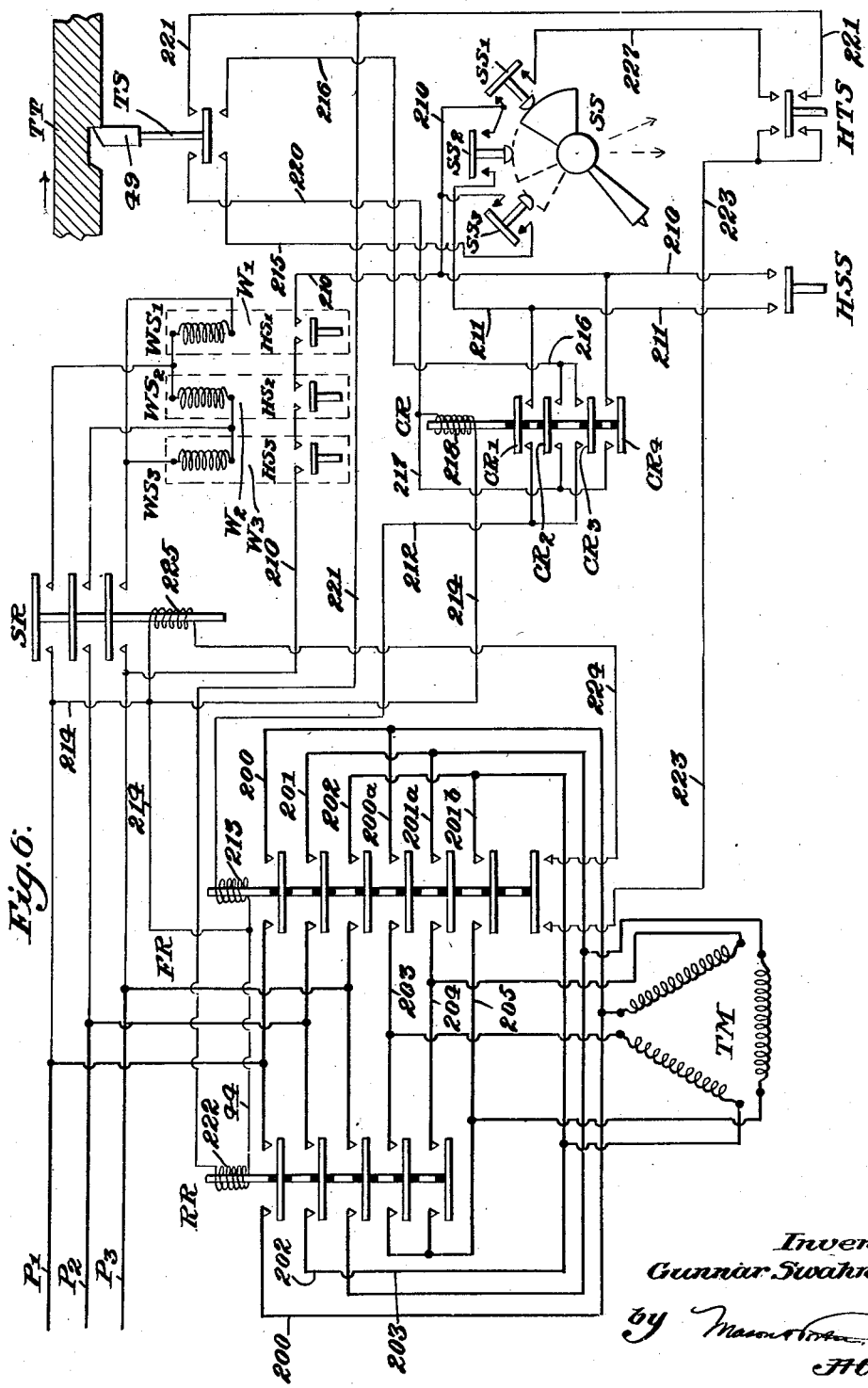

Patented Aug. 13, 1935

2,011,488

UNITED STATES PATENT OFFICE 2,011,488

MECHANICAL MOVEMENT FOR TURRET AND LIKE DEVICES

Gunnar Swahnberg, Keene, N. H., assignor to Kingsbury Machine Tool Corporation, Keene, N. H., a corporation of New Hampshire Application March 14, 1935, Serial No. 11,153

5 Claims. (Cl. 29—50)

In driving rotating devices, it is often desirable that the rotational movement be caused to occur at different angular rates at different portions of each revolution. Thus, a rotatable member must receive successive accelerations and decelerations during its travel.

This is particularly the case in operating turrets and like devices, as it is desirable to provide a rotating or indexing mechanism which will operate to advance or index the turret within a minimum time to avoid the consumption of any considerable portion of the total working period in this operation, during which the effective tools are not being employed. For this purpose, as brought out in the copending application of myself and Edward J. Kingsbury, Serial No. 729,006, filed June 4, 1934, it has been proposed to advance the turret by an accelerating movement followed by a decelerating one, and more particularly to control the system by circuit arrangements which are made and/or broken at the proper point of the working cycle for initiating and terminating the movements of the turret table.

According to the present invention, a very simple and compact structure is provided for producing acceleration and deceleration of the rotatable member at the required times and comprises an epicyclic gearing having a member driven by a source of power for accomplishing the indexing, and including means operated by the planet pinion for effecting the movement.

Other features of the invention reside in the association and interaction of the several parts and in the structures provided in such parts, as will appear more closely from the following specification and claims.

An illustrative form of construction, in which the rotatable member is a turret table, is set out on the accompanying drawings, in which:

Figure 1 is a side elevation of a machine tool including a tool of the present nature.

Figure 2 is a horizontal section substantially on line 2—2 of Fig. 3.

Figure 3 is an upright sectional view substantially on line 3—3 of Fig. 2.

Figure 4 is a fragmentary detail section substantially on line 4—4 of Fig. 2.

Figure 5 is a similar fragmentary section showing a latching and circuit controlling device.

Figure 6 is a circuit diagram.

In the structure illustrated on these drawings, the base B of the machine tool is hollow for receiving the turret advancing mechanism and supports the turret table TT upon its top. A stiff central column C is supported by the base B, being held against movement by suitable devices 10 for preventing relative rotation thereof about a vertical axis. This column C supports a head D having slides S on which are mounted work units W1, W2 in any suitable number. Each of these work units includes a motor M1, M2 for operating the same and producing the feeding movements of a tool spindle N1, N2 so that the corresponding tool (shown in dotted lines) is caused to operate upon an article of work A which is momentarily positioned therebeneath while the turret table TT is at a standstill.

The turret table TT is indexed by power derived from an electric motor TM which is supported by a bracket TB rotatably mounted on a pin 11 supported by the base B immediately inside of an aperture BA provided in the base. The motor bracket may be swung outwardly about the pin 11 when it is desired to adjust or repair parts of the motor and indexing mechanism.

The motor rotates a motor shaft 12 having a worm thereon (Fig. 3) which is in mesh with a wormwheel 13 splined on a shaft 14 supported by suitable bearings in the bracket TB. The upper end of the shaft 14 is provided with a gear 15 which meshes with a gear ring 16 fixed to an annular member 17 mounted for easy rotation about a central portion BC of the base B. This annular member 17 supports a pivot pin 18 about which may rotate a planet gear 19 which is constantly in mesh with an internally cut gear ring 20 fixed to the top wall BT of the base B.

The gear 19 eccentrically supports a pin 21 which engages in one end of a driving link 22 (Figs. 2, 3 and 4), this link having its other end engaged with a pin 23 fixed to the lower surface of the turret table TT.

Thus, if the motor TM is in rotation to produce a movement of the gear 15 in the direction shown by the arrow in Fig. 2, this gear 15 rotates the annular member 17 in a clockwise direction so that the planet pinion 19 is carried bodily therewith and about the central axis of the column C. The gear 19 travels on the gear ring 20 and thus is rotated in a counterclockwise direction relatively about its pivot pin 18. As the pin 21, located on gear 19, the teeth of which are engaged with the gear ring 20, is momentarily at a standstill with respect to angular movement about the axis of the column C, the turret table TT is thus momentarily at a standstill, in the position of Fig. 2. As the annular member 17 continues to turn in a clockwise direction, the pin 21 travels through a cycloidal path, and the ring 22 draws the turret table TT after the pivot pin 18, this movement being at a maximum rate when the pin 21 is momentarily located in the plane joining the axis of column C with the axis of pin 18, passing to this maximum by an accelerating movement and thereafter decelerating until the pin 21 again comes into the plane of intersection of the axis of the column C and the pin 18, but with the pin 21 again located adjacent the gear ring 20. Thus, so long as the motor TM is permitted to remain in rotation, the turret table TT is advanced by accelerating and decelerating movements, coming to a standstill to complete each cycle of such movements.

As shown in Figs. 5 and 6, the turret table TT is provided with recesses along its periphery, and in practice the number of these recesses corresponds to the number of stations at which the turret is to be brought to a standstill. Each of these recesses comprises an upward extension from the lower surface 40 of the turret table TT and is bounded by an inclined surface 41, the bottom surface 42, and by the surface 43 which is located in a plane parallel to the axis of the turret table TT and the column C; this surface 43 is preferably provided by an inserted stop member 44 rigidly carried by the turret table TT and having a suitably hardened structure to resist wear and impact.

Beneath the turret table in the base B is provided a flange 45 having a boss 46 thereon in which is threaded a screw 47 having a reduced upper end 47a engaged in a compression coil spring 48 which extends within the central cavity of the lock pin 49. This lock pin has an upright surface 50 which may be engaged with the surface 43, and also has an end surface 51 for engagement with the inclined surface 41. The lock pin 49 is guided by bushings 52 in an aperture of the top wall BT. This top wall also receives a guide pin 53 by a force-fit, the lower end of pin 53 being guided by a suitable hole in the flange 45. At the lower end of the lock pin 49 is provided an arm 54 which extends away from the axis thereof and is secured thereto by a clamping pin or screw 55 shown in section (Fig. 5). This guide arm 54 has a bifurcated end 54a engaging the pin 53, so that the lock pin is guided and held against rotation about its own axis. The arm 54 also receives an actuating member illustrated as a cap screw 56 having a lock nut 57 and engaged in a threaded opening of the arm 54. When the lock pin 49 is depressed, the head of the cap screw 56 engages the movable member 58 of the turret switch TS and causes the making and breaking of contacts in a manner to be described in conjunction with the circuit diagram of Fig. 6. The turret switch TS is illustrated as supported by an arm 59 fixed on a sleeve 60 which is adjustably carried by the pin 53.

The position shown in Fig. 5 illustrates the location of the parts when the turret table is at rest and properly located at a station. The lock pin 49 is raised and the surfaces 43 and 50 are in engagement for determining the exact location of the turret table TT at station. Immediately upon energization of the motor for forward movement, the turret table TT is caused to move toward the right in Figs. 5 and 6 (as shown by the arrows), so that the surfaces 41 and 51 cooperate in effecting a downward movement of the locking pin 49 against the action of the spring 48. Thus, the screw 56 actuates the turret switch TS to make one set of contacts and to break another set of contacts in the manner evident from Fig. 6. Thereafter, the lock pin 49 is held in depressed position by engaging the surface 40. After the turret table TT has moved through a predetermined angle, corresponding to the separation of two stations, the lock pin glides over the bottom surface 44 of the stop member 44 of the recess for the new station and then is forced upwardly into the recess for this station by the action of the spring 48. Thus, the switch TS reopens the bridge which has meanwhile been held closed, and closes the bridge which has meanwhile been held open, in the manner apparent from Fig. 6; the making and remaking of circuits thus produces the proper energization of the motor and causes the turret table TT to be given the desired acceleration and deceleration through the operation of the mechanical linkage, with a final engagement of the surfaces 43 and 50 fixedly together to determine exactly the proper positioning of the turret table at station.

In order to provide the desired forward and retrograde movements of the turret, a reversible motor is illustratively employed, under the control of forward and reverse relays which are selectively operated in a cycle of movement, in association with the releasing of the individual work units for operation, and their return to fully withdrawn position.

In the diagram of Fig. 6, such an arrangement has been shown, and is connected and operates as follows:

The three phase supply conductors, P1, P2, P3 are joined by branch conductors to contacts of the forward relay FR and reverse relay RR. When the forward relay is closed, the conductors 200, 201, 202 are energized and current is thus delivered to one end of each of the three phase windings of the motor TM. Further, the branch conductors 200a, 201a, 201b are likewise under control of further bridges in the forward relay FR so that, when this relay is closed, the conductors 203, 204, 205 are energized and therewith connection established to the other ends of the phase windings in the motor TM so that this motor is operated in delta connection and turns in a forward direction.

On the contrary, when the reverse relay RR is energized, current is likewise supplied to the conductors 200, 201, 202 (the latter two being reversed in connection to the main phase conductors P2, P3) and current is again supplied to one end of each of the motor phase windings. The reverse relay RR comprises further bridges which operate to connect the conductors 203 and 204 to conductor 205 directly, and thus a star connection is established for the energization of the motor TM in a reverse direction.

In the cycle of movement, as each of the work units W1, W2, W3 returns to its withdrawn position, a corresponding head switch HS1, HS2, HS3 is closed. These head switches are arranged in series in a conductor 210 leading from phase conductor P3 and extending to one contact each of the bridges of individual switches SS1, SS2 and SS3 of the selecting switch SS, to a contact of the hand set-up switch HSS and to a contact of bridge CR4 of the control relay CR, this bridge CR4 being normally open. The turret dial switch TS is in raised position owing to the presence of the dial notch above it (Fig. 5). Current now flows from conductor P3 by conductor 210, through the head switches HS1, HS2, HS3, conductor 210, switch bridge SS2, conductor 211, normally closed bridge CR1 of control relay CR, conductor 212, the energizing coil 213 of forward relay FR, conductor 214 back to phase conductor P1. The forward relay FR is energized, closes its contactors, and the motor M begins to turn in a forward direction. The turret dial or table TT then turns in the direction of the arrow. A short forward movement of the turret table TT depresses the turret switch TS and closes a circuit which leads as before by conductor 210 through the head switches to selector switch bridge SS3 and thence by conductor 215 to the turret switch TS and thence by conductor 216 to the normally closed bridge CR2 of control relay CR and by conductor 217 to the energizing coil 218 of relay CR with a return by conductor 214 to phase conductor P1. The control relay CR is thus energized. By construction, the normally closed contact bridges CR1 and CR2 remain engaged until the normally open contacts CR3 and CR4 thereof are closed, and then open. Thus, a maintaining circuit is established from conductor 216 by bridge CR3 to conductor 212 for maintaining the energization of the coil 213 of ᵢforward relay FR. Furthermore, the bridge CR4 establishes a maintaining circuit for the relay CR from conductor 210 to conductor 217.

When the turret table TT has completed a forward movement which is equivalent to the forward movement for indexing, the turret switch TS returns to its upper position, as the notch in the turret table TT comes opposite the same. The circuit through conductors 216, 212 is thus broken and the coil 213 is de-energized so that the forward relay FR drops open. A new circuit is now set up which extends from conductor 210 through the closed maintaining bridge CR4 of relay CR by conductor 217, conductor 220, the bridge of turret switch TS, conductor 221, and energizing coil 222 of reverse relay RR, with a return by conductor 214 to phase conductor P1. The reverse relay RR is thus energized, the motor is caused to rotate in the reverse direction, and a retrograde movement is given to the turret table TT until the lock pin is engaged by the upright wall of the notch in the turret table, and the turret table brought to a standstill in the correct indexed position.

The conductor 221 from turret switch TS also extends to contacts of the head trip switch HTS which are normally closed by the bridge thereof so that a further circuit is established through conductor 223, through contacts which are closed when the forward relay FR is open and thence by conductor 224 to the energizing coil 225 of the solenoid relay SR with a return by conductor 214 to phase conductor P1. The solenoid relay SR is thus energized and closes to deliver current from each of the phase conductors P1, P2, P3 to the trip solenoids WS1, WS2, WS3, in the three illustrated working units or heads. It will be noted that these solenoids draw their current from different phases and are connected in delta. The work units are thus individually tripped and begin their forward movement. As each unit leaves the withdrawn position, the corresponding head switches HS1, HS2, HS3 are opened. As soon as one of these head switches opens, it breaks the series circuit connection through the conductor 210, and all of the pilot circuits are thus de-energized, so that the forward relay FR, the reverse relay RR, the control relay CR, and the solenoid relay SR, have their respective coils deenergized, if not already in this position, and the system returns to its original status ready for the start of a new cycle of operation. During this quiescent period of the motor TM, the individual work units complete their operation and then return to withdrawn position and successively close the corresponding series switch HS1, HS2, HS3.

It will be noted that this fully automatic operation recurs cyclically so long as the handle of the selector switch SS is in the position indicated, and holds the bridge SS1 open.

If the handle SS is moved to position for opening at bride SS2, the bridges SS1 and SS3 remain closed. The circuit from conductor 210 to conductor 211 is not closed at the completion of the cycle, and hence there is no automatic continuation of the mechanism in its movement. Instead, if the hand set-up switch HSS is closed, a circuit is established as before from conductor 210 to conductor 211, as the hand set-up switch HSS is in shunt to the switch controlled by bridge SS2. Further, its position is to trip the working heads without turret movement, when the bridge SS2 is open. For this purpose, the head trip switch HTS is pressed, thus opening the circuit by conductors 221—223—224; and closing a circuit from conductor 210 through bridge SS1, conductor 227, conductor 223, the normally closed bridge of forward relay FR (thus preventing a tripping of the heads when the forward relay is energized so that indexing is occurring), by conductor 224, for energizing the coil 225 of the solenoid relay SR Further, when the selector switch SS is moved to position for again opening the bridges SS2 and SS3 and for closing the bridge SS1, an "inching" operation is feasible. A circuit extends from conductor 210 when all of the units are in withdrawn position and through the head switches HS1, HS2, HS3 to the hand set-up switch HSS, and from this switch when closed, by conductor 211 to the normally closed bridge CR1 of the control relay CR and thence by conductor 212 to the coil 213 of the forward relay FR, and thence back to the phase conductor P1. The forward relay FR is thus energized and held closed for forward movement of the motor just as long as the hand setting switch HSS is held closed. As soon as this switch is released and opens, the relay FR is deenergized and the motor is brought to a standstill. Thus, the turret table may be "inched" or "jogged" through a part of a revolution by the manipulation of a hand setting switch HSS which is usually constructed as a push button device. At this time, the reverse relay RR can get no current as its coil 222 can receive no current through the control CR, as this current normally flows by the path of conductors 221 and the normally open bridges of control relay CR. As bridge SS2 is open, the coil 218 of control relay CR cannot be energized. The turret switch TS thus becomes temporarily ineffective as it is, so to speak, now shunted off the hand set-up switch HSS, but in such a manner that forward motion only can be produced, and the forward relay FR can be energized immediately. Also, it will be noted that the head trip switch HTS, which is customarily employed for tripping the heads by hand during the initial operations of setting up the machine tool for work, that is, while "inching" may be utilized for the turret table, is so constructed that upon being depressed to close its normally open contact, the normally closed contact is previously opened, thus avoiding any possibility of a connection from phase conductor P3 through bridge SS3 to the coil 222 of the reverse relay RR.

In the form of construction shown, the turret motor TM and associated parts are supported on the pivot pin 11, the axis of the driving shaft 14 which is turned by the worm 12 being parallel to the axis of the column C and to the axis of the pin 11. Hence, it is possible to remove the motor from the base B without mechanical separation of parts so that realignment thereof is later required. For this purpose, it is merely necessary to swing the bracket TB about the pin 11. When in the inward and operating position (Fig. 2), the bracket TB is held clamped by a threaded member 80 engaged with a projection 81 of the bracket TB and engaged with the internal wall BW of the base B.

Furthermore, this removal of the motor permits easy access to and adjustment of the parts adjacent to the lock pin 49; and also of access to the parts adjacent the gear 19 and link 22, when these have been brought to a position above the normal position of the turret motor TM and its gear 15.

It is obvious that the invention is not limited solely to the form of construction shown, but that it may be modified in many ways within the scope of the appended claims.

I claim:

1. A mechanism comprising a frame, a source of power, an element to be rotated by accelerating and decelerating movements, a member rotated by said source, a gear on the frame, a travelling gear carried bodily with said member in rolling mesh with said frame gear so that the travelling gear is rotated about its axis as it is carried along, and a link connecting a point on said element eccentric to the axis of the element with a point on the travelling gear eccentric to the axis of the travelling gear.

2. A mechanism comprising a frame, a source of power, an element to be rotated by accelerating and decelerating movements, a member rotated by said source, a gear on the frame, a travelling gear carried bodily with said member in rolling mesh with said frame gear so that the travelling gear is rotated about its axis as it is carried along, a link connecting a point on said element eccentric to the axis of the element with a point on the travelling gear eccentric to the axis of the travelling gear, and means including cooperative devices on the frame and element for controlling said source according to the position of the element relative to the frame.

3. A mechanism comprising a frame, a motor, an element to be rotated by cyclic accelerating and decelerating movements, a member rotated by said source, a gear on the frame, a traveling gear carried bodily with said member in rolling mesh with said frame gear so that the traveling gear is rotated about its axis as it is carried along, a link connecting a point on said element eccentric to the axis of the element with a point on the traveling gear eccentric to the axis of the traveling gear, means including cooperative devices on the frame and element for reversing said source of power after a single movement of said element whereby to produce a retrograde movement of the element, a stop for bringing the element to a standstill during the retrograde movement and at a predetermined position, and means for initiating a further forward movement of the motor.

4. A mechanism comprising a frame, a motor, an element journalled for rotation relative to the frame, a first member coaxial with said element and connected for rotation by said motor, a revoluble member eccentrically mounted on said first member for bodily movement during the rotation thereof, a pivot eccentrically mounted on said revoluble member, means on said frame coacting with said revoluble member to cause the same to turn about its axis as it is moved bodily, and means connected to the element and to said pivot for moving said element.

5. A machine tool comprising a base, a turret rotatable with respect to said base, a turret motor, a sleeve member coaxial with said turret and connected for rotation by said motor, a travelling gear journalled on the sleeve member for rotation about an axis parallel to and opposite from the turret axis, a gear on said base in constant mesh with said travelling gear, and link means connecting eccentric points on said element and on said travelling gear.

GUNNAR SWAHNBERG.